G. T. FRANCISCO.
MEAT SAWING OR CUTTING MACHINE.
APPLICATION FILED JUNE 7, 1910.
986,450.  Patented Mar. 14, 1911.
3 SHEETS—SHEET 2.
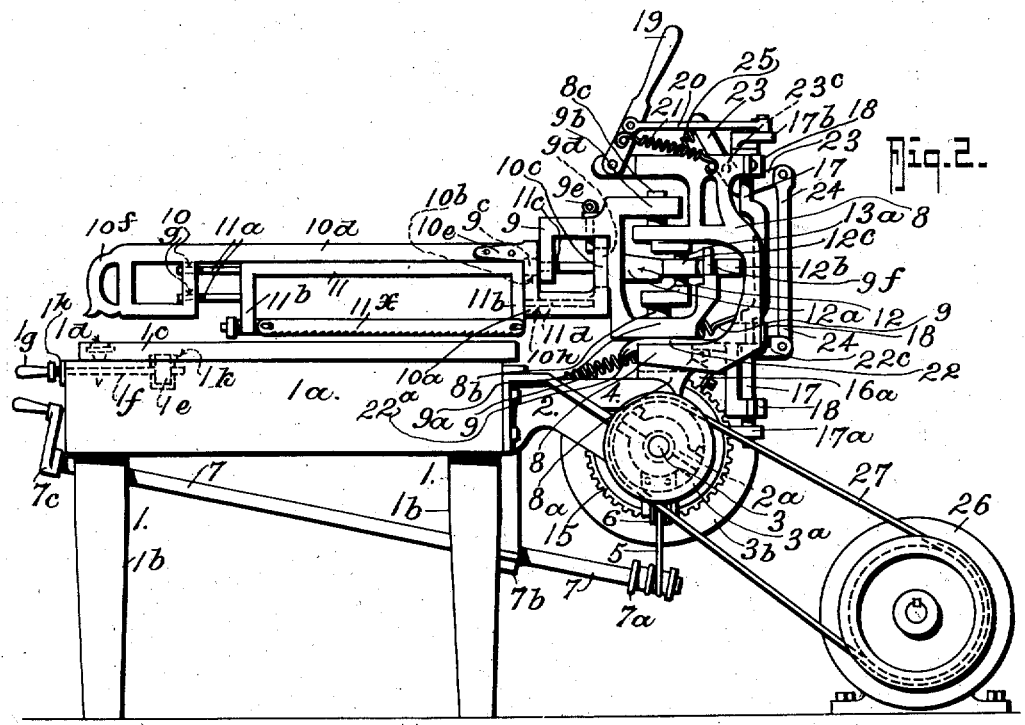
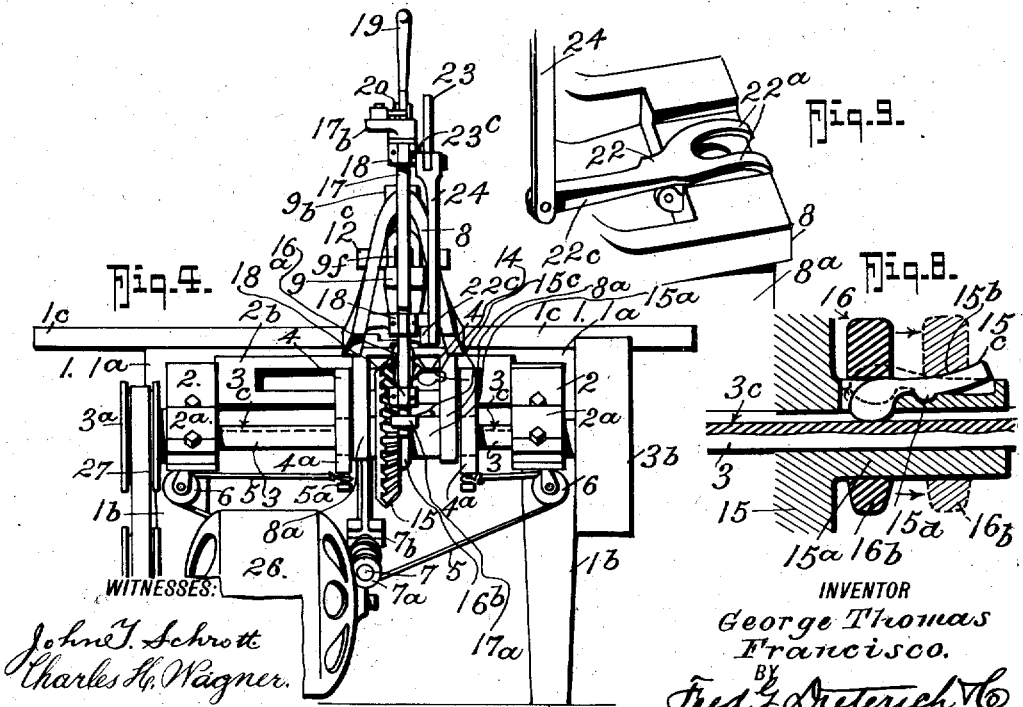

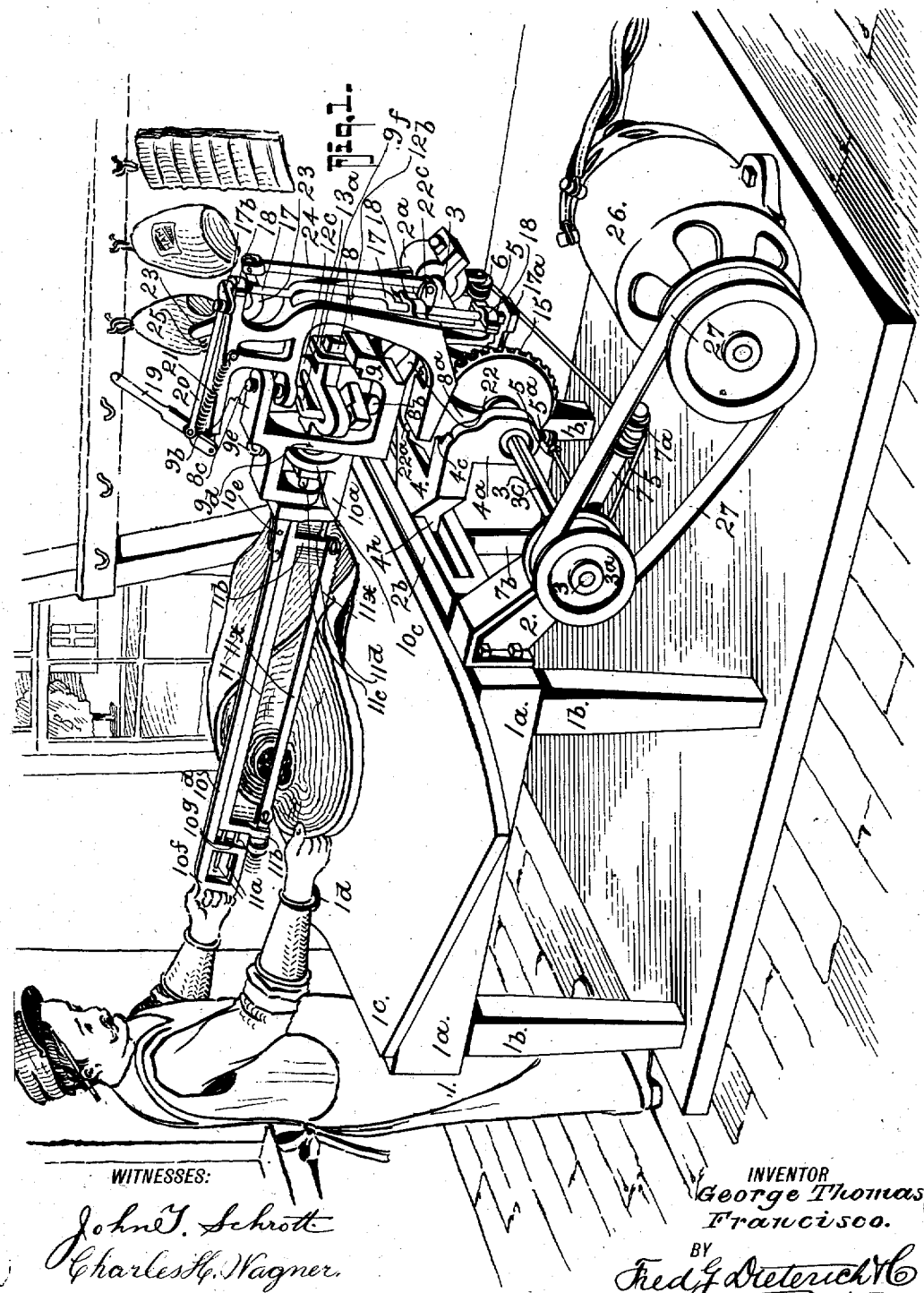

G. T. FRANCISCO.
MEAT SAWING OR CUTTING MACHINE.
APPLICATION FILED JUNE 7, 1910.
986,450.
Patented Mar. 14, 1911.
3 SHEETS—SHEET 3.
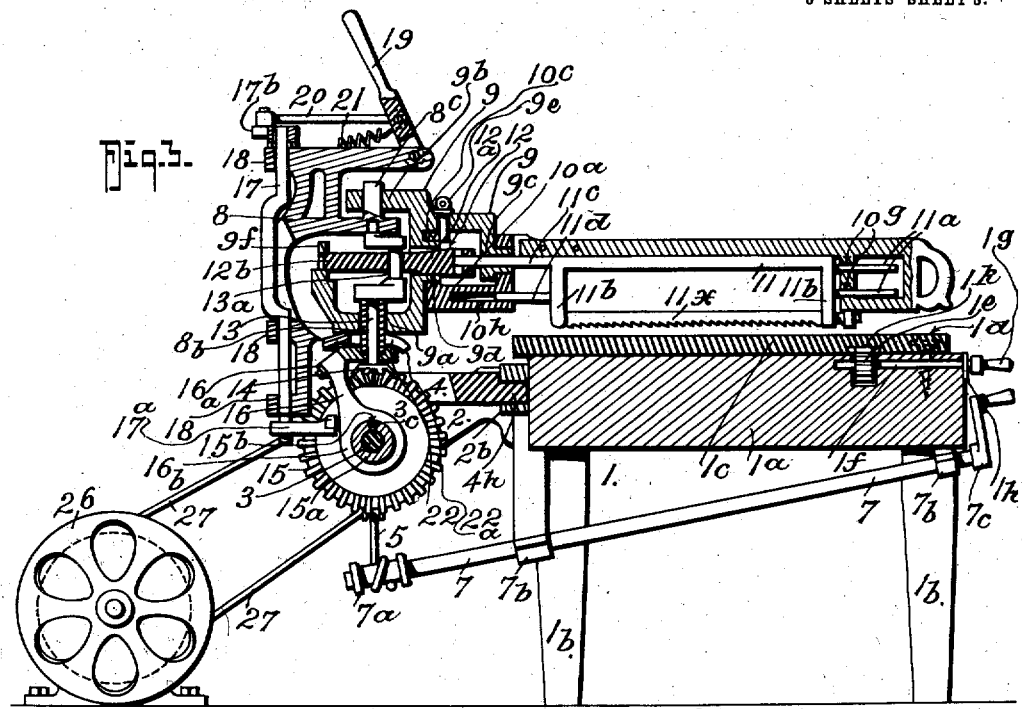
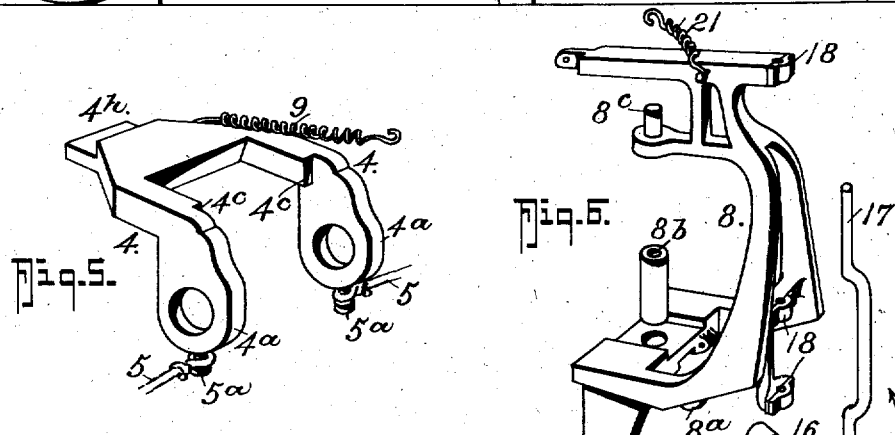
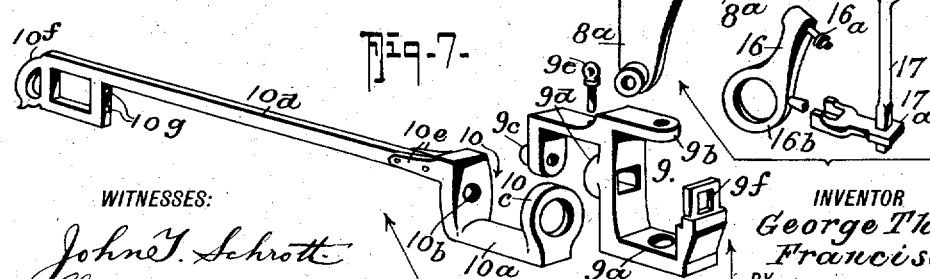
WITNESSES:
John T. Schrott
Charles H. Wagner
INVENTOR
George Thomas Francisco.
BY
Fred J. Dieterich
ATTORNEYS.

UNITED STATES PATENT OFFICE.

GEORGE THOMAS FRANCISCO, OF HIGHLAND, CALIFORNIA, ASSIGNOR OF ONE-HALF TO CLAUDIUS M. HILL, OF HIGHLAND, CALIFORNIA.

MEAT SAWING OR CUTTING MACHINE.

986,450.     Specification of Letters Patent.     Patented Mar. 14, 1911.

Application filed June 7, 1910. Serial No. 565,442.

*To all whom it may concern:*

Be it known that I, GEORGE THOMAS FRANCISCO, residing at Highland, in the county of San Bernardino and State of California, have invented certain new and useful Improvements in Meat Sawing or Cutting Machines, of which the following is a specification.

My invention relates to certain new and useful improvements in meat sawing, slicing and cutting machines, and in its generic nature the invention resides in providing a cutting table having an adjustable top on which the meat is laid, and providing a motor-driven cutting mechanism susceptible of universal adjustment whereby the meat may be sliced and the bones sawed, as conditions may require.

In its more detailed nature the invention resides in providing a motor driven shaft on which a shifting carriage or frame is mounted and held from turning on the shaft, means being provided for shifting such frame along the shaft; a main frame is supported on the shaft to turn thereon and the turning movement of this frame is maintained within certain limits by spring and abutment devices so that under normal conditions the main frame will set vertically; the main frame carries an auxiliary frame that in turn carries the saw or cutting tool carrying frame. The auxiliary frame is mounted to turn on a vertical axis and the saw carrying frame is mounted to turn on a horizontal axis. A saw holder is reciprocably mounted in the saw carrying frame and is reciprocated through a link connection with a crank shaft that is supported by the main frame and driven through gears from the main shaft, suitable clutching devices being pivoted to throw the gears into and out of operation, and means are also provided for raising and lowering the saw with relation to the table in planes parallel to itself, the main frame being swingable on the main shaft so that the saw may be swung up away from the meat, or other article being worked upon, when desired.

In its more subordinate nature the invention also comprises those novel details of construction, combination and arrangement of parts, all of which will be first described and then be specifically pointed out in the appended claims, reference being had to the accompanying drawings, in which:

Figure 1, is a perspective view showing my invention when in use. Fig. 2, is a side elevation of the machine. Fig. 3, is a central, vertical longitudinal section of the machine. Fig. 4, is a rear elevation of the machine. Fig. 5, is a detail perspective view of the shifting frame. Fig. 6, is a detail perspective view of the main frame. Fig. 7, is a detail perspective view of the auxiliary frame. Fig. 8, is an enlarged detail view of the clutching mechanism. Fig. 9, is a detail perspective view of the auxiliary frame lifting device.

Referring now to the accompanying drawings in which like letters and numerals of reference indicate like parts in all of the figures, 1 designates the table or support which includes the stationary top $1^a$ and legs $1^b$. Pivoted at $1^d$ on the top $1^a$ is an adjustable top $1^c$ that is movable on its pivot by a pinion $1^e$ on a shaft $1^f$ that is mounted in the top $1^a$ and turned by a crank $1^g$, the pinion $1^f$ meshing with a rack $1^k$ on the shiftable top $1^c$, as indicated. A crank $1^g$ on the shaft $1^f$ serves as a means by which the shaft may be turned and the crank $1^g$ is of the pawl type to engage a rack member $1^h$ on the top to hold the shaft from turning, and thereby hold the top $1^c$ immovable. The meat to be cut or sawed is placed on the block or top $1^c$.

Projecting forwardly from the table 1 is a pair of brackets 2 having bearings $2^a$ in which the main shaft 3 is mounted. The shaft 3 carries a drive pulley $3^a$ and a fly wheel $3^b$. Longitudinally movable on the shaft 3 is a shifting frame 4 having forked bearing portions $4^a$, through which the shaft 3 passes. The frame 4 also has a portion $4^b$ that projects into a slotted guide $2^b$ between the brackets 2 to prevent the frame 4 turning on the shaft 3 while still permitting it to be shifted longitudinally on the shaft. The shifting of the frame 4 is done by a cable 5 whose ends are attached at $5^a$ to the forks $4^a$ and the cable 5 passes over idler sheaves 6—6 on the brackets 2 and is wound on a drum $7^a$ on the shaft 7 that is supported in bearings $7^b$ beneath the table top $1^a$. The shaft 7 may be turned by a crank $7^c$ or other equivalent device.

The main frame 8 has forked bearings $8^a$ to receive the shaft 3 and be held between the forks $4^a$ of the shifting frame 4. The main frame 8 swivels on the shaft 3 and has its movement limited by shoulders $4^c$ on the shifting frame 4. These shoulders $4^c$ act together with a spring 9 to sustain the main frame in a vertical position under normal conditions.

The frame $8^a$ has a bearing sleeve $8^b$ and a bearing lug $8^c$ to support an auxiliary frame 9 that has bearing portions $9^a$—$9^b$ for the cylinder $8^b$ and lug $8^c$ respectively. The frame 9 is susceptible of vertical movement in such main frame for purposes later to appear. The frame 9 also has bearings $9^c$—$9^d$, on projecting sleeves of which the saw carrying frame 10 is mounted. The frame 10 comprises a substantially U-shaped stock $10^a$ having bearings $10^b$—$10^c$ to receive the bearings $9^c$—$9^d$, one of which bearings $10^c$ is of disk form to engage a retaining pin $9^e$ on the frame 9 to hold the saw frame 10 in place. The saw frame 10 also includes a section $10^d$ that is removably secured to a projection $10^e$ on the stock $10^a$ and has a handle $10^f$ at its forward end by which the saw carrying frame may be turned on an axis at right angles to that on which the frame 10 is mounted.

The saw carrying frame has bearings $10^g$—$10^g$ and $10^h$ for the saw holder 11 which reciprocates in the frame 10 and has rods $11^a$—$11^a$ that play in the bearings $10^g$—$10^g$ and the saw holder 11 also has a rod $11^d$ that operates in the bearing $10^h$. The rod $11^c$ being longer than the rod $11^b$ projects through the bearing $9^c$ of the frame 9 and is swivelly secured to the pitman 12 whose end $12^a$ slides in the bearing $9^d$ and whose opposite end $12^b$ slides in a bearing $9^f$ on the frame 9. The pitman 12 has a slotted yoke $12^c$ for the crank $13^a$. The crank $13^a$ is carried by the crank shaft 13 that passes through the bearing $8^b$ and carries a pinion 14 which meshes with a master gear 15 on the main shaft 3. The saw holder has portions $11^b$ to receive and hold the saw, knife or other suitable cutting tool $11^x$.

The main shaft 3 has a key groove $3^c$ and the gear 15 has a hub $15^a$ in which a key $15^b$ is pivoted to enter the groove $3^c$ and cause the gear to turn with the shaft.

16 is a shifter that is pivoted at $16^a$ to the main frame and has an eye $16^b$ to receive the hub $15^a$ and key $15^b$. The key $15^b$ has a heel $15^c$ that projects out of the hub and the latch or key has a fulcrum bearing $15^d$ for the hub. The shifter 16 is normally held over the clutching end of the key $15^b$ to hold the same in the groove $3^c$, as clearly shown in Fig. 8 of the drawings. When it is desired to cause the master gear to run loose on the shaft 3 the shifter 16 is shifted over the heel $15^c$ thereby causing the key to turn on its fulcrum and disengage the key groove $13^c$ in the shaft.

17 is a vertical shaft that is mounted in bearings 18 in the main frame. On the lower end of the shaft 17 is an arm $17^a$ which connects with the shifter 16 to shift the same. The shaft 17 is turned by a lever 19 on the top of the main frame 8, which lever is connected to the crank $17^b$ on the upper end of the shaft 17 by a connecting rod 20, as shown. A spring 21 holds the lever 10 in a position to hold the shifter 16 over the clutching end of the key $15^c$ to thereby keep the master gear 15 clutched to the shaft 3.

In order to raise and lower the auxiliary frame on its ends to cause the saw or cutting tool to be raised or lowered parallel to itself, I provide a fork 22 whose ends are slipped under the auxiliary frame 9 below the bearing $9^a$ and straddling the bearing $8^b$, and the ends of the fork 22 are curved at $22^a$ so that as the fork is moved one way or the other, the frame 9 will be lifted or lowered, as the case may be. The fork 22 is operated by a bell crank lever 23 that is fulcrumed at $23^c$ to the main frame and connected by a rod 24 to the handle $22^c$ of the fork 22, as shown, a spring 25 serving to keep the fork in a normal position, as shown.

The shaft 3 is driven from any suitable motor 26 that is belted or otherwise connected at 27 with the shaft 3.

In operation the meat to be cut is placed on the shifter table top which is then adjusted to present the meat in the proper position for cutting, after which, (it being assumed that the motor is running to drive the shaft 3) the lever is shifted to cause the shifter 16 to bring the key $15^b$ into engagement with the slot of the shaft 3 to lock the master gear to the shaft so as to set the cutting tool into reciprocation, after which the operator grasping the hand piece of the saw carrying frame guides it to the work as conditions may require. By providing the universal mounting of the saw, as shown and described, the saw may be made to cut the meat in any desired direction. At the beginning of the cutting operation the auxiliary frame may be adjusted to its uppermost position and lowered through the medium of its lowering devices as the cut proceeds. When it is desired to make the next cut it is only necessary to shift the shifter frame along the shaft an amount necessary to bring the saw into position to cut the next piece off of the main part of the meat on the table top.

From the foregoing description taken in connection with the accompanying drawings it is thought the complete construction, operation and advantages of my invention will be readily understood by those skilled in the art to which the invention appertains.

What I claim is:

1. In a machine of the class described, a table, a rotatable operating shaft supported thereby, a main frame slidably mounted on said shaft, an auxiliary frame movably mounted on said main frame, a saw carrying frame pivotally mounted on said auxiliary frame, a saw holder mounted on said saw carrying frame and means coöperatively connecting said saw holder with said shaft for transmitting the motion of said shaft into reciprocating motion in said holder.

2. In a machine of the character stated, a table, brackets projected from said table, a main shaft rotatable in bearings in said brackets, a main frame pivotally mounted on said shaft, means holding said main frame normally in a predetermined position, an auxiliary frame pivoted to said main frame on a vertical axis, a saw carrying frame pivoted to said auxiliary frame on a horizontal axis, a reciprocating saw holder carried by said saw carrying frame, a crank shaft carried by said main frame, connections between said crank shaft and said saw holder, a gear on said main shaft, a gear on said crank shaft meshing with said main shaft gear, and means for imparting motion to said main shaft.

3. In a machine of the character stated, a table, brackets projected from said table, a main shaft rotatable in bearings in said brackets, a main frame pivotally mounted on said shaft, means holding said main frame normally in a predetermined position, an auxiliary frame pivoted to said main frame on a vertical axis, a saw carrying frame pivoted to said auxiliary frame on a horizontal axis, a reciprocating saw holder carried by said saw carrying frame, a crank shaft carried by said main frame, connections between said crank shaft and said saw holder, a gear on said main shaft, a gear on said crank shaft meshing with said main shaft gear, means for imparting motion to said main shaft, and a clutch device carried by said main shaft gear for connecting said gear with said main shaft, and means on said main frame for shifting said clutch device to connect and disconnect said main shaft gear.

4. In a machine of the character stated, a table, brackets projected from said table, a main shaft rotatable in bearings in said brackets, a main frame pivotally mounted on said shaft, means holding said main frame normally in a predetermined position, an auxiliary frame pivoted to said main frame on a vertical axis, a saw carrying frame pivoted to said auxiliary frame on a horizontal axis, a reciprocating saw holder carried by said saw carrying frame, a crank shaft carried by said main frame, connections between said crank shaft and said saw holder, a gear on said main shaft, a gear on said crank shaft meshing with said main shaft gear, means for imparting motion to said main shaft, and means on said main frame for raising and lowering said auxiliary frame.

5. In a machine of the character stated, a table, brackets projected from said table, a main shaft rotatable in bearings in said brackets, a main frame pivotally mounted on said shaft, means holding said main frame normally in a predetermined position, an auxiliary frame pivoted to said main frame on a vertical axis, a saw carrying frame pivoted to said auxiliary frame on a horizontal axis, a reciprocating saw holder carried by said saw carrying frame, a crank shaft carried by said main frame, connections between said crank shaft and said saw holder, a gear on said main shaft, a gear on said crank shaft meshing with said main shaft gear, means for imparting motion to said main shaft, a clutch device carried by said main shaft gear for connecting said gear with said main shaft, means on said main frame for shifting said clutch device to connect and disconnect said main shaft gear, and means on said main frame for raising and lowering said auxiliary frame.

6. In a machine of the character stated, a table, a main rotatable shaft mounted in bearings carried by said table, a main frame carried by said shaft and movable along the same, a shifting frame engaging said main frame, a guide for said shifting frame, means for moving said shifting frame along said shaft to shift said main frame, saw carrying and operating devices supported by said main frame, gear connections between said devices and said main shaft, and means for controlling the operation of said saw carrying and operating devices and operatively connecting and disconnecting them with said main shaft.

7. In a machine of the character stated, a table, a rotatable operating shaft, a main frame pivotally and shiftably supported on said shaft, a shifting frame engaging said main frame for shifting it along said shaft, resilient means for holding said main frame in a vertical position, an auxiliary frame hingedly secured to said main frame on a vertical axis, a saw carrying frame supported by said auxiliary frame, a reciprocating saw holder mounted in bearings in said saw carrying frame, a crank shaft having a crank on said main frame, a slotted pitman carried by said auxiliary frame and connected with said saw holder and said crank, a gear mounted in said crank shaft, a gear loosely mounted on said main shaft to mesh with said crank shaft gear, and clutch devices causing said main shaft gear to clutch said main shaft.

8. In a machine of the character stated, a table, a rotatable operating shaft, a main frame pivotally and shiftably supported on said shaft, a shifting frame engaging said main frame for shifting it along said shaft, resilient means for holding said main frame in a vertical position, an auxiliary frame hingedly secured to said main frame on a vertical axis, a saw carrying frame supported by said auxiliary frame, a reciprocating saw holder mounted in bearings in said saw carrying frame, a crank shaft having a crank on said main frame, a slotted pitman carried by said auxiliary frame and connected with said saw holder and said crank, a gear mounted in said crank shaft, a gear loosely mounted on said main shaft to mesh with said crank shaft gear, clutch devices causing said main shaft gear to clutch said main shaft, and lever operated devices on said main frame for controlling the action of said clutch devices.

9. In a machine of the character stated, a table, a rotatable operating shaft, a main frame pivotally and shiftably supported on said shaft, a shifting frame engaging said main frame for shifting it along said shaft, resilient means for holding said main frame in a vertical position, an auxiliary frame hingedly secured to said main frame on a vertical axis, a saw carrying frame supported by said auxiliary frame, a reciprocating saw holder mounted in bearings in said saw carrying frame, a crank shaft having a crank movable on said main frame, a slotted pitman carried by said auxiliary frame and connected with said saw holder and said crank, a gear mounted in said crank shaft, a gear loosely mounted on said main shaft to mesh with said crank shaft gear, clutch devices causing said main shaft gear to clutch said main shaft, and means carried by said main frame for raising and lowering said auxiliary frame.

10. In a machine of the class described, a table, an adjustable top mounted on said table, means for adjusting said top, a main shaft carried by said table, a main frame on said shaft, a saw carrying frame universally connected with and supported by said main frame, a reciprocating saw holder carried by said saw carrying frame, a crank shaft carried by said main frame, power transmission connections between said crank shaft and said saw holder, gear connections between said main shaft and said crank shaft, and means for imparting motion to said main shaft.

11. In a machine of the class described, a table, an adjustable top mounted on said table, means for adjusting said top, a main shaft carried by said table, a main frame on said shaft, a saw carrying frame universally connected with and supported by said main frame, a reciprocating saw holder carried by said saw carrying frame, a crank shaft carried by said main frame, power transmission connections between said crank shaft and said saw holder, gear connections between said main shaft and said crank shaft, means for imparting motion to said main shaft, said gear connections including clutch devices for rendering said gear connections operative and inoperative.

12. In a machine of the class described, a table, an adjustable top mounted on said table, means for adjusting said top, a main shaft carried by said table, a main frame on said shaft, a saw carrying frame universally connected with and supported by said main frame, a reciprocating saw holder carried by said saw carrying frame, a crank shaft carried by said main frame, power transmission connections between said crank shaft and said saw holder, gear connections between said main shaft and said crank shaft, means for imparting motion to said main shaft, said gear connections including clutch devices for rendering said gear connections operative and inoperative, and means on said main frame for controlling the action of said clutch devices.

13. In a machine of the class described, a table having an adjustable top, means for adjusting said top, a main rotatable shaft carrier by said table, a main frame carried by said shaft, means for shifting said main frame along said shaft, a saw carrying frame universally connected with said main frame, a saw holder carried by said saw carrying frame, and power transmission devices connecting said saw holder with said main shaft.

14. In a machine of the class described, a table having an adjustable top, means for adjusting said top, a main rotatable shaft carried by said table, a main frame carried by said shaft, means for shifting said main frame along said shaft, a saw carrying frame universally connected with said main frame, a saw holder carried by said saw carrying frame, power transmission devices connecting said saw holder with said main shaft, and means supported by said main frame for controlling the operation of said power transmission devices.

GEORGE THOMAS FRANCISCO.

Witnesses:
   D. D. YARNELL,
   JAY GANER.